United States Patent
Takahashi et al.

(10) Patent No.: US 6,856,853 B2
(45) Date of Patent: Feb. 15, 2005

(54) SIMULATION DEVICE

(75) Inventors: Nobuyuki Takahashi, Tokyo (JP);
Yoshinori Tsujido, Tokyo (JP); Kenji Iriguchi, Tokyo (JP); Kiyoshi Okada, Aichi (JP); Takashi Kamiya, Aichi (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/815,749

(22) Filed: Apr. 2, 2004

(65) Prior Publication Data

US 2004/0225405 A1 Nov. 11, 2004

(30) Foreign Application Priority Data

Apr. 22, 2003 (JP) ........................................ 2003-117310

(51) Int. Cl.[7] ............................................. G06F 19/00
(52) U.S. Cl. ........................................ 700/178; 708/290
(58) Field of Search ................................ 700/178, 183, 700/184, 186, 187–190; 708/290

(56) References Cited

U.S. PATENT DOCUMENTS 6,400,998 B1 * 6/2002 Yamazaki et al. ............. 700/86
6,647,314 B2 * 11/2003 Kato et al. .................. 700/187
2001/0021881 A1 * 9/2001 Iriguchi et al. .............. 700/160
2001/0024098 A1 * 9/2001 Takahashi et al. ........... 318/569

FOREIGN PATENT DOCUMENTS

| JP | 64-41905 | 2/1989 |
|----|----------|--------|
| JP | 1-311304 | 12/1989 |

* cited by examiner

Primary Examiner—Jayprakash N. Gandhi
Assistant Examiner—Zoila Cabrera
(74) Attorney, Agent, or Firm—Leydig, Voit & Mayer, Ltd.

(57) ABSTRACT

A simulation device is provided with a speed ratio determining portion and a speed determining portion for calculating the maximum feeding speed of an operative part from an interference detecting distance and an interpolation period, and replacing the feeding speed of the operative part, which is read out by a program analyzing portion, with the maximum feeding speed; and an interpolating portion for determining interpolated points of a moving path of the operative part from the feeding speed of the operative part, which is replaced by the maximum feeding speed by the speed ratio determining portion and the speed determining portion, and the interpolation period. An interference check on the operative part is made at an interpolated point determined by the interpolating portion.

6 Claims, 5 Drawing Sheets

G1X140.394Y86.739F840.
X133.419Y86.685
X115.479Y86.477
X111.989Y86.436
X107.003Y86.394
X102.016Y86.374

SIMULATION DEVICE

BACKGROUND OF THE INVENTION

1. Field of the Invention

The present invention relates to a simulation device making an interference check on an operative part.

2. Description of the Related Art

An NC (numerical control) program (hereinafter, a unit of instructions described in an NC program is referred to as a block) is required to carry out machining by an existing numerical control (NC) machine tool. Generally, an NC program contains instructions to instruct a machine to move at a moving speed and numerical values representative of a specific moving speed.

Recently, with an increasing complexity of structure of a machine tool, its operations are more complicated. For this reason, it is not seldom that a variety of portions of the machine can mutually interfere, and the machine and a target (hereinafter referred to as a work) can interfere with each other. Therefore, to avoid such unfavorable interference, the necessity for simulation of behavior of the machine is increasing, of which main purpose is for keeping an interference check thereof.

Here, there can be the case where path data is automatically generated by an automatic programming device like a program programmed by the automatic programming device, not an NC program. However, because the generated path data describes, even in this case, a moving instruction of respective driving shafts of the machine comparable to the NC program, the NC machine tool with such an automatic programming device is also within the scope of simulation.

For example, Japanese Patent Publication JP 64-041905 A (Pages. 3–4) reads as follows: "In a simulation display such as a robot, when a figure is displayed in response to a positional instruction, a starting point and an ending point are successively displayed, but a state between the two points can not." As is evident from the above patent publication, the conventional simulation device can use according to circumstances the end points of a block as a moving instruction of a device. In this manner, a moving instruction so adopted the end points of the block as a moving instruction will be referred hereinafter to as a block level instruction.

Moreover, Japanese Patent Publication JP 1-311304 A (Pages. 5–9, and FIG. 1) reads as follows: "A command pulse fed to a servo motor of a machine tool is intercepted, and thereby enabling a check not only on the coordinates of a program, but also on the machine coordinate system." As stated in the above Patent Publication, among simulation devices, there is a simulation device adopted instruction data to a servo system connected with a subordinate position of a controller (hereinafter, the instruction data is referred to as an actual machine level instruction).

The instruction data to the servo system includes a sequence of points not indicated by a program generated on a path of program instruction. The process finding the sequence of points not indicated on the instruction path is referred to as an interpolation process. The sequence of points generated by the interpolation process is referred to as an interpolated point.

Here, the interpolated point is a point obtained, on the instruction path, when an operative part is advanced at an instructed speed F during a time period dt specific to the device.

A distance L from the current position to the next interpolated position is found by the following equation. This length is referred to as an interpolation length.

$$L = F \times dt \tag{1}$$

Since the conventional simulation devices are arranged as mentioned above, in case of the block level instruction, an end point of the block is taken as an interpolated point. For this reason, a simulation is executed using fewer interpolated points than the actual machine level instruction. Therefore, there is a possibility of executing a simulation in a shorter time than cases where the machine is actually operated. However, omission can occur in an interference detection because of low accuracy of an interference check.

Meanwhile, in case of the actual machine level instruction, a simulation is executed using as many interpolated points as an actual machine operation. Accordingly, a simulation takes at least as much time as the actual machine operation.

SUMMARY OF THE INVENTION

The present invention has been made to solve the above-mentioned problems. An object of the present invention is to provide a simulation device able to make an interference check without omission in an interference detection in a shorter time than actual machining.

A simulation device according to the present invention includes replacing means for calculating the maximum feeding speed of an operative part from an interference detecting distance and an interpolation period, and replacing a feeding speed of the operative part, which is read out by program analyzing means, with the maximum feeding speed thereof; and interpolation point determining means for determining interpolated points of a moving path from the feeding speed of the operative part, which is replaced with the maximum feeding speed by the replacing means, and the interpolation period, wherein the simulation device keeps an interference check of the operative part at an interpolated point determined by the interpolation point determining means.

As mentioned above, through the arrangement of the simulation device according to the present invention including replacing means for calculating the maximum feeding speed of the operative part from the interference detecting distance and an interpolation period, and replacing a feeding speed of the operative part, which is read out by program analyzing means, with the maximum feeding speed thereof; and interpolation point determining means fort determining the interpolated points of the moving path from the feeding speed of the operative part, which is replaced with the maximum feeding speed by the replacing means, and the interpolation period; wherein an interference check is made at an interpolated point determined by the interpolation point determining means, the arrangement makes an interference check without omission in the interference detection in a shorter time than the actual machining.

DETAILED DESCRIPTION OF THE PREFERRED EMBODIMENTS

Preferred embodiments of the present invention will now be described below with reference with the attached drawings.

First Embodiment

Figure 1:
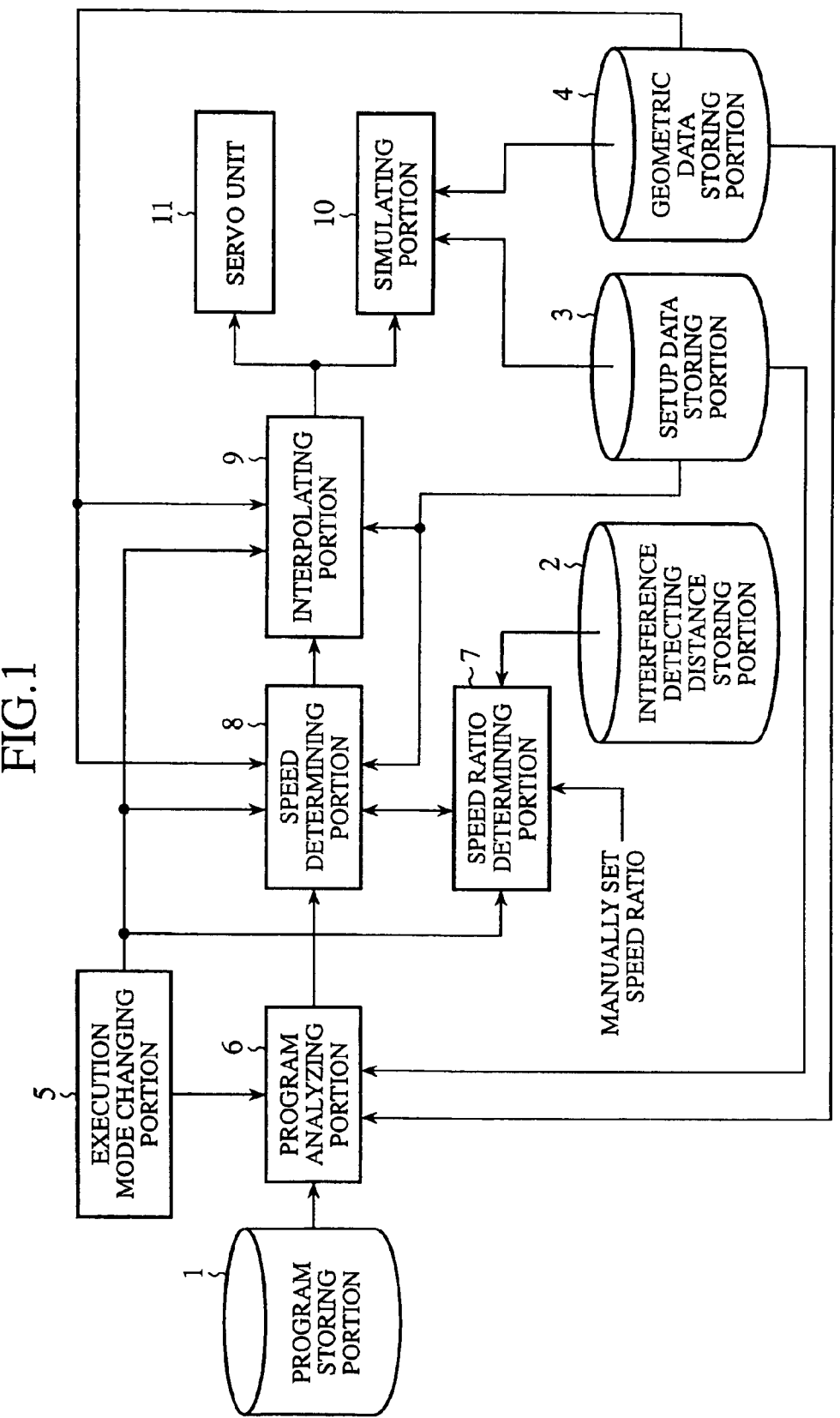
FIG. 1 is a block diagram showing a simulation device according to a first embodiment of the present invention.

FIG. 1 is a block diagram showing a simulation device according to the first embodiment of the present invention.

Figures 2, 3:
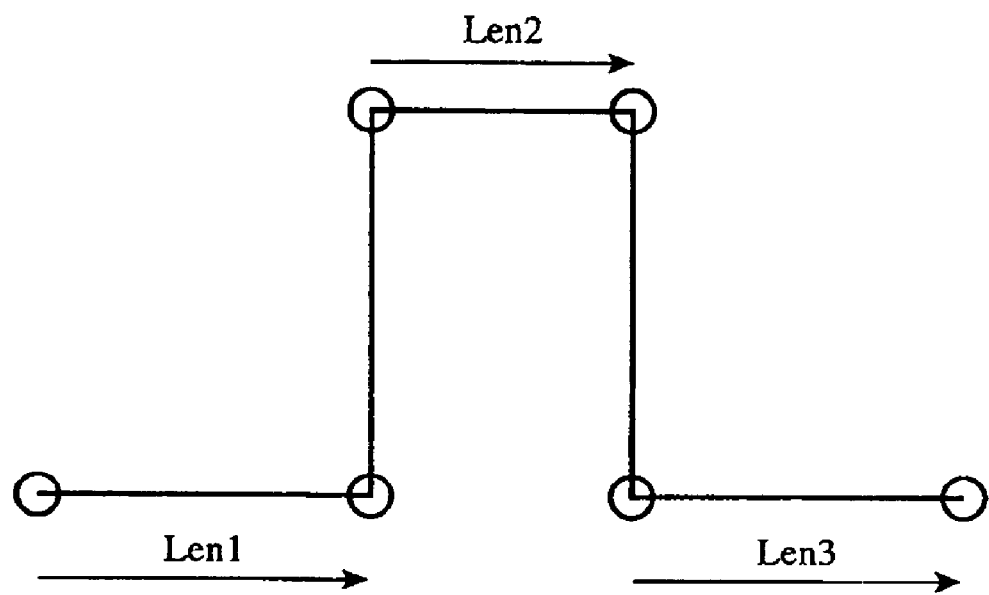
FIG. 2 is an explanatory diagram showing an exemplary description of an NC program.
FIG. 3 is an explanatory diagram showing a moving path.

Referring to FIG. 1, a program storing portion 1 stores an NC program or other programs for an automatic programming system described therein feeding speeds and positional instructions of an operative part, e.g., a robot's arm and foot, and a cutting tool (see FIG. 2). An interference detecting distance storing portion 2 stores interference detecting distances, e.g., the distance between an operative part A and an operative part B, the distance between the operative part A and a stationary part C, such as a main body or foundation of the machine. Moreover, a setup data storing portion 3 stores setup data of jig and work arrangements or the like. A geometric data storing portion 4 stores geometric data of the machine, geometric data of jigs, geometric data of tools, or the like in the virtual three-dimensional simulation space. In passing, the program storing portion 1, the interference detecting distance storing portion 2, the setup data storing portion 3, and the geometric data storing portion 4 are constituted of memory or the like.

An execution mode changing portion 5 is, e.g., constituted of such input interfaces as a keyboard or a mouse, and such output interfaces as a display unit. The changing portion receives a mode change between an actual machine operation mode and a simulation mode under the directions of an operator of the simulation system, or receives from other devices an instruction indicative of a mode change between an actual machine operation mode and a simulation mode.

A program analyzing portion 6 constitutes program analyzing means for reading out feeding speeds and the positional instructions of the operative part from the NC program and other programs for the automatic programming system stored in the program storing portion 1.

A speed ratio determining portion 7 outputs a speed ratio manually set by a user, to a speed determining portion 8 in the case where an actual machine operation mode is selected by the execution mode changing portion 5. On the other hand, in the case where a simulation mode is selected by the execution mode changing portion 5, the speed ratio determining portion 7 divides an interference detecting distance stored in the interference detecting distance storing portion 2 by an interpolation period to calculate a simulation speed, divides the simulation speed by the feeding speed of the operative part, which is read out by the program analyzing portion 6, to calculate a speed ratio, and outputs the speed ratio to the speed determining portion 8. The speed determining portion 8 multiplies the feeding speed of the operative part by the speed ratio output by the speed ratio determining portion 7 to calculate the maximum feeding speed of the operative part for replacing the moving speed of the operative part by the maximum feeding speed thereof. In passing, the speed ratio determining portion 7 and the speed determining portion 8 constitute the replacing means.

An interpolating portion 9 constitutes interpolation point determining means for determining interpolated points of a moving path of the operative part from a feeding speed of the operative part, which is replaced with the maximum feeding speed by the speed determining portion 8, and an interpolation period. A simulating portion 10 constitutes simulation means for making an interference check on the operative part at an interpolated point determined by the interpolating portion 9, when a simulation mode is selected by the execution mode changing portion 5.

The servo unit 11 constitutes driving means for driving the operative part in accordance with feeding speeds and positional instructions of the operative part, which is output by the speed determining portion 8, when an actual machine operation mode is selected by the execution mode changing portion 5.

Say in addition, the program analyzing portion 6, the speed ratio determining portion 7, the speed determining portion 8, the interpolating portion 9, and the simulating portion 10 may be composed of hardware, e.g., a dedicated IC circuit. Alternatively, it may also be programmed in which the above-stated processes are written to run the program on a computer (not shown).

The operation of the first embodiment will now be described below.

The program analyzing portion 6 analyzes the NC program or other programs for the automatic programming system stored in the program storing portion 1, and then, reads out the feeding speed F and positional instructions of the operative part written in these programs.

Figure 4:
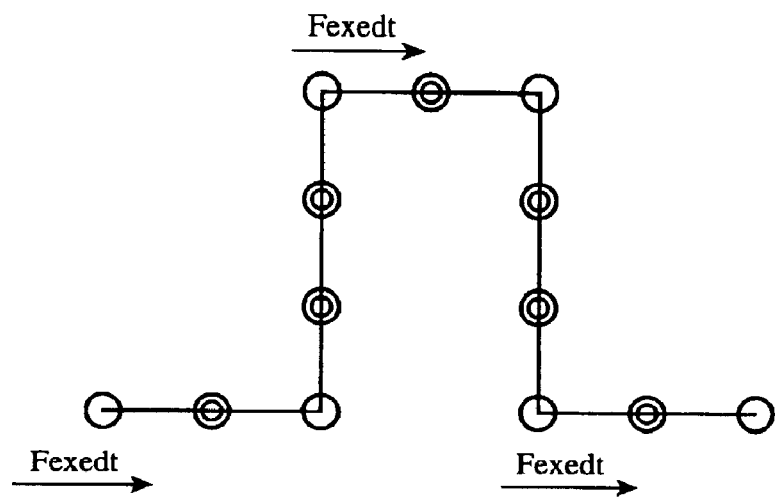
FIG. 4 is an explanatory diagram showing interpolated points of a moving path.

The speed ratio determining portion 7 calculates the speed ratio R as follows, in order to interpolate a moving path of the operative part specified based on the positional instructions of the operative part, which is read out by the program analyzing portion 6. Where a solid line shown in FIG. 3 indicates a moving path of the operative part, and the positions denoted by "○" are specified based on the positional instructions of the operative part. The positions denoted by "⊙" shown in FIG. 4 indicate interpolated points of the operative part.

That is, the speed ratio determining portion 7 divides, when a simulation mode is selected by the execution mode changing portion 5, an interference detecting distance K stored in the interference detecting distance storing portion 2 by an interpolation period dt to calculate a simulation speed Fs, as expressed by the following equation. Then, the speed ratio determining portion 7 divides the simulation speed Fs by the feeding speed F of the operative part, which is read out by the program analyzing portion 6 to calculate a speed ratio R, and output the speed ratio R to the speed determining portion 8. However, when the actual machine operation mode is selected by the execution mode changing portion 5, the speed ratio determining portion 7 outputs the speed ratio R manually set by a user to the speed determining portion 8, just as the speed ratio is.

$$Fs = (C \times K)/dt \quad (2)$$

$$R = Fs/F \quad (3)$$

Where, "C" in the equation (2) is a predetermined coefficient and it may be determined according to some adequate rules. A concrete way to give the coefficient C will be described later.

The reason why the interference detecting distance K is multiplied by C in the equation (2) is to safely detect the operative part lies in close proximity to another part, when the operative part moves only during one interpolation period, before the distance between the two parts comes to zero and below, and they come into collision with each other. Accordingly, the coefficient C is usually set to a positive value and below one.

When a speed ratio R is received from the speed ratio determining portion 7, the speed determining portion 8 multiplies the feed speed F of the operative part, which is read out by the program analyzing portion 6, by the speed ratio R, as shown by the following equation, calculates the maximum feeding speed Fexe of the operative part, and outputs the maximum feeding speed Fexe to the interpolating portion 9 as a feeding speed of the operative part.

$$Fexe = R \times F \tag{4}$$

When the maximum feeding speed Fexe is received, which is the feeding speed of the operative part, from the speed determining portion 8, the interpolating portion 9 multiplies the maximum feeding speed Fexe by the interpolation period dt, as expressed by the equation to calculate a length L (referred to as an interpolation length hereinafter), along which the operative part moves only during one interpolation period. Thereby, the interpolating portion determines interpolated points (denoted by "⊙" shown in FIG. 4) of a moving path of the operative part from the positions (denoted by "○" shown in FIG. 3) specified based on the positional instructions of the operative part, which is read out by the program analyzing portion 6, and the interpolation length L.

$$L = Fexe \times dt \tag{5}$$

The simulating portion 10 executes a simulation at the interpolated points, which are determined by the interpolating portion 9, when a simulation mode is selected by the execution mode changing portion 5 to update a positional attitude of the operative part in its geometric data stored in the geometric data storing portion 4, calculates the distance between a plurality of operative parts, or the distance between certain operative parts and stationary parts, checks whether or not the parts interfere with each other.

For example, when the parts are in the state of interference with each other, the simulating portion displays the parts that are affected with each other on a display (not shown), and a message indicating that an interference is occurred between the parts is displayed on a display.

The servo unit 11 actually drives the operative part in accordance with feeding speeds and positional instructions of the operative part, which is output by the speed determining portion 8, when the actual machine operation mode is selected by the execution mode changing portion 5.

Now, how to determine the coefficient C and how to find the maximum feed speed Fexe of the operative part will be specifically described below.

When an object to be undergoing a simulation is only one machine with one operative part, e.g., a cutting tool, the interpolation length L may be distributed among respective parts constituting the machine. Accordingly, the interference detecting distance K may be taken as the interpolation length L. In other wards, the simulation speed Fs may be calculated by letting C=1.

However, in the case where an object to be undergoing a simulation has a plurality of operative parts, and individual speeds are given to the parts, or the case where a plurality of machines are to be simulated in the same simulation space, there can be situations as the most dangerous case in which the plurality of parts move on the same line, and move closer to one another. In such a case, the coefficient C should be set, e.g., to C=0.5.

Figure 5:
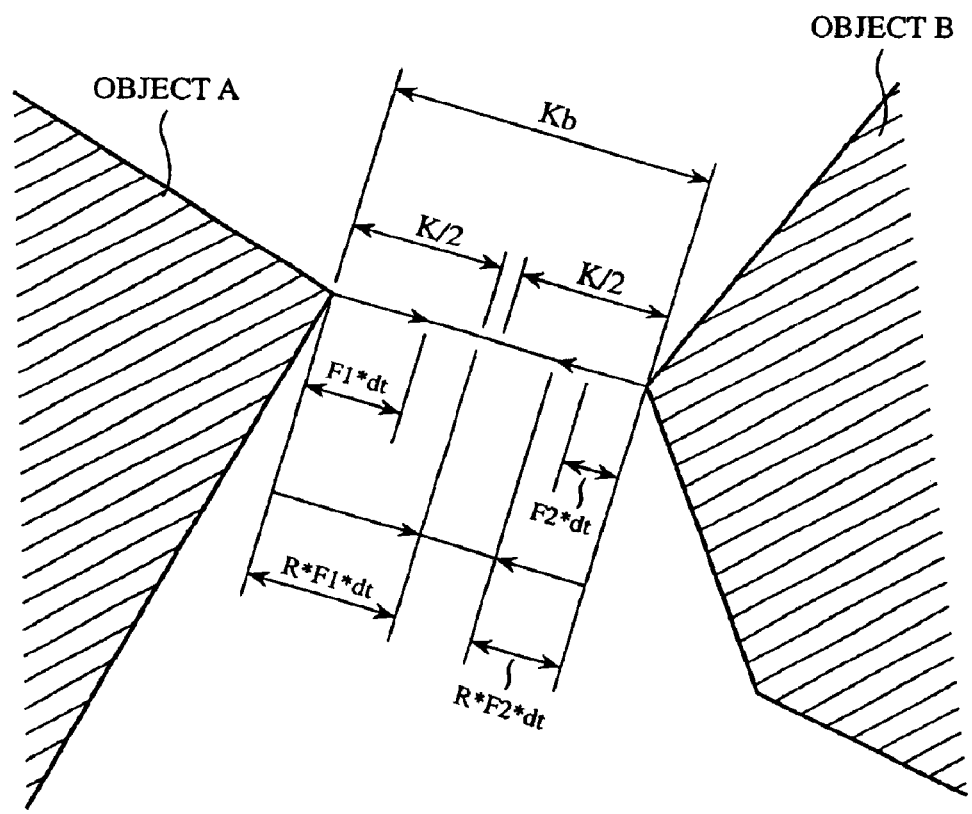
FIG. 5 is an explanatory diagram showing situations where two operative parts move.

FIG. 5 is an explanatory diagram showing situations where two operative parts (Object A and Object B) are moving in the same direction on the same line and they move closer to each other, and the coefficient C is set to 0.5 (i.e., a half of the interference detecting distance K is taken as the interpolation length L.).

At this point of time, FIG. 5 shows situations in which the distance between the object A and object B is a value Kb slightly larger than the interference detecting distance K.

In order to determine an interpolation point for a simulation in the next interpolation period from a point of time, a simulation speed Fs is determined by using equation (2) as mentioned above.

Next, where an object to be undergoing a simulation is only one machine with one operative part for a work, the feeding speed F of the operative part is substituted for equation (3) to find the speed ratio R.

However, in the case where there are a plurality of operative parts, the maximum speed F is found from among the feeding speeds of the operative parts, e.g., from among the instructed speeds Fi (i=0, 1, . . . , n) for n operative parts.

$$F = \max\{F0, F1, \ldots, Fn\} \tag{6}$$

Subsequently, the maximum speed F and the simulation speed Fs are substituted for equation (3) to find the speed ratio R.

Finally, the instructed speeds Fi for n operative parts is multiplied by the speed ratio R to calculate the maximum feeding speed NFi (corresponding to Fexe of equation (4)) for n operative parts.

$$NFi = R \times Fi \tag{7}$$

Thus, in the case where there are a plurality of operative parts, the maximum speed F is selected from among the instructed speeds Fi for n operative parts, and find the speed ratio R to the simulation speeds Fi, which is obtained from the interference detecting distance K that is a distance over which it can be assured that there will be no interference, and the instructed speeds Fi for all operative parts are multiplied by the same speed ratio R to find the maximum feeding speed NFi for each of the operative parts. This quickens a run time while keeping the positional relationship between the operative parts kept in the same state as with the actual machine operation, by omitting too closely interpolated points for the purpose of making an interference check therebetween.

In passing, even though a machine has one cutting tool, or the coefficient C may be set to one and less.

Finally, verification will be carried out as to the fact that an interference check made in the simulation mode takes a shorter time than that made in the actual machine operation mode. The process of verification will be described using real numeric values with a machine tool as an example, which has one operative part controlled by a numerical control device, and to which a speed of the operative part is given.

For example, setting the interpolation period dt=1.0 ms, the NC program instruction cutting speed F=5,000 mm/min, the interference detecting distance K=3 mm, and the coefficient C=1 leads to the following results: the simulation speed is Fs=180,000 mm/min from equation (2), and the speed ratio is R=36 from equation (3).

$$Fs = (C \times K)/dt$$
$$= (1 \times 3 \times 60 \times 1000)/1.0$$
$$= 180,000$$
$$R = Fs/F$$
$$= 180,000/5,000$$
$$= 36$$

Accordingly, a simulation will be executed using the points interpolated by a toll-up speed multiplied by 36.

In this connection, if dt=5.0 ms, then Fs=36,000 mm/min is obtained. Therefore, a simulation will be executed using the points interpolated by a moving speed multiplied by 7.2.

Generally speaking, a speed when a positioning instruction is given higher than a cutting speed. The existing machine tools execute, e.g., 20,000–100,000 mm/min or so. Therefore, a simulation can always be executed at the substantially same speed as a positioning instruction.

In this way, the use of an interpolated point on the basis of the interference detecting distance K prevents occurrence of a failure in detecting an interference, and executes a simulation faster than an actual machine operation.

The above verification touched the case where the instructed speed is lower than that obtained from the interference detecting distance K. On the contrary, in the case where the instructed speed is higher than that obtained from the interference detecting distance K, interference is successively detected without failure. An example thereof will now be described below using real numerical values.

The example will be described the truth using real numerical values that even if an instructed speed is high, and further an interference detecting distance is extremely small, an interference is detected without failure with a machine tool as an example, which has two operative parts, and to which speeds of the operative parts are given.

As an example of a machine tool with two operative parts, called as a multiline machine tool is given. The multiline machine tool is a machine tool having a plurality of tool rests, which is simultaneously independently operable, as mentioned in Japanese Patent Publication JP 205301 A 1. The portion extending from respective cutting tools to a driving joint of the machine is referred to as a "line.", and it is said that the machine has two lines if two cutting tools are independently operable.

For example, assuming the interpolation period to be dt=1.0 ms, which is common to line 1 and line 2, the instructed cutting speeds to be F1=10,000 mm/min for line 1 and to be F2=8,000 mm/min for line 2, and the interference detecting distance to be K=0.1 mm. Then, finding the maximum speed for each of the operative parts F after the fashion of the case where the machine has a plurality of operative parts, the following results are obtained:

$$F = \max\{F1, F2\} = F1 = 10,000 \text{ mm/min.}$$

Meanwhile, letting, e.g., C=0.5 in equation (2) leads to the simulation speed $$Fs = (0.5 \times K \times 60 \times 1,000)/dt = 9,000 \text{ mm/min.}$$

Therefore, the speed ratio R is given by R=Fs/F=9,000/10,000=0.9 from equation (3), and a simulation will be executed using the points interpolated at a moving speed of 0.9 higher than an instructed cutting speed F1.

That is, the above result shows that detection is unfeasible with the interpolation period unless the speeds get slower 0.9 times than the instructed speeds for the purpose of detecting without omission an approach of operative parts to a distance of 0–0.1 mm between the two lines. Conversely, when multiplying by 0.9, the distance reproduced by a simulation, an approach with each other to the range of 0–0.1 mm can be unfailingly detected.

As is clear from the above description, the simulation device according to the first embodiment is provided with the replacing means (speed ratio determining portion, speed determining portion 8) for calculating the maximum feeding speed of the operative part from an interference detecting distance and an interpolation period, and replacing the feeding speed of the operative part, which is read out by the program analyzing portion 6, with the maximum feeding speed, and the interpolation portion 9 for determining interpolated points of a moving path of the operative part based on a moving speed of the operative part, which is replaced with the maximum feeding speed by the replacing means and an interpolation period. The above arrangement thus configured as above makes an interference check in a shorter time than the actual machining without omission of an interference detection.

Second Embodiment

Figure 6:
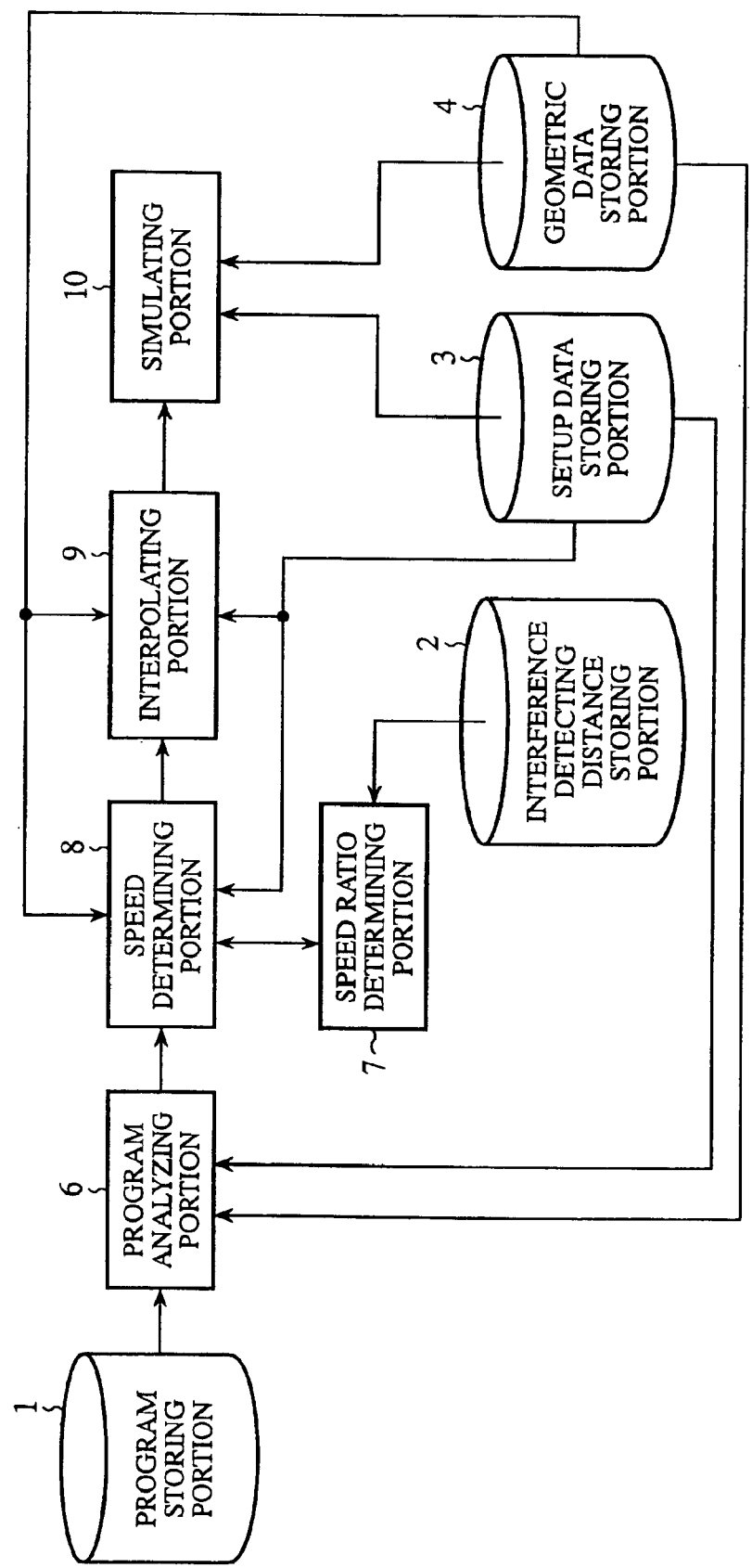
FIG. 6 is a block diagram showing a simulation device according to a second embodiment of the present invention.

While in the first embodiment, the execution mode changing portion 5 changes an execution mode between an actual machine operation mode and a simulation mode, the simulation device may be modified to a system dedicated to the simulation mode without implementing the execution mode changing portion 5 and the servo unit 11, as shown in FIG. 6.

In this way, the omission of capabilities incorporated in the simulation device permits arrangement of the simulation device outside the numerical control device. Accordingly, the actual machine operation and an interference check through a machine simulation can be independently performed at any given time, without stopping the actual machine operation for executing a simulation. Therefore, while machining a work on the actual machine by using an already checked NC program, a simulation can be executed concurrently to check an NC program for the next machining. This enhances the overall work efficiency ranging from program verification and an actual machine operation can be enhanced.

Say in addition, function parts implemented in the numerical control device may be ported, just as they are, to function parts in the simulation device, or may be specifically designed for a machine simulation.

Third Embodiment

Figure 7:
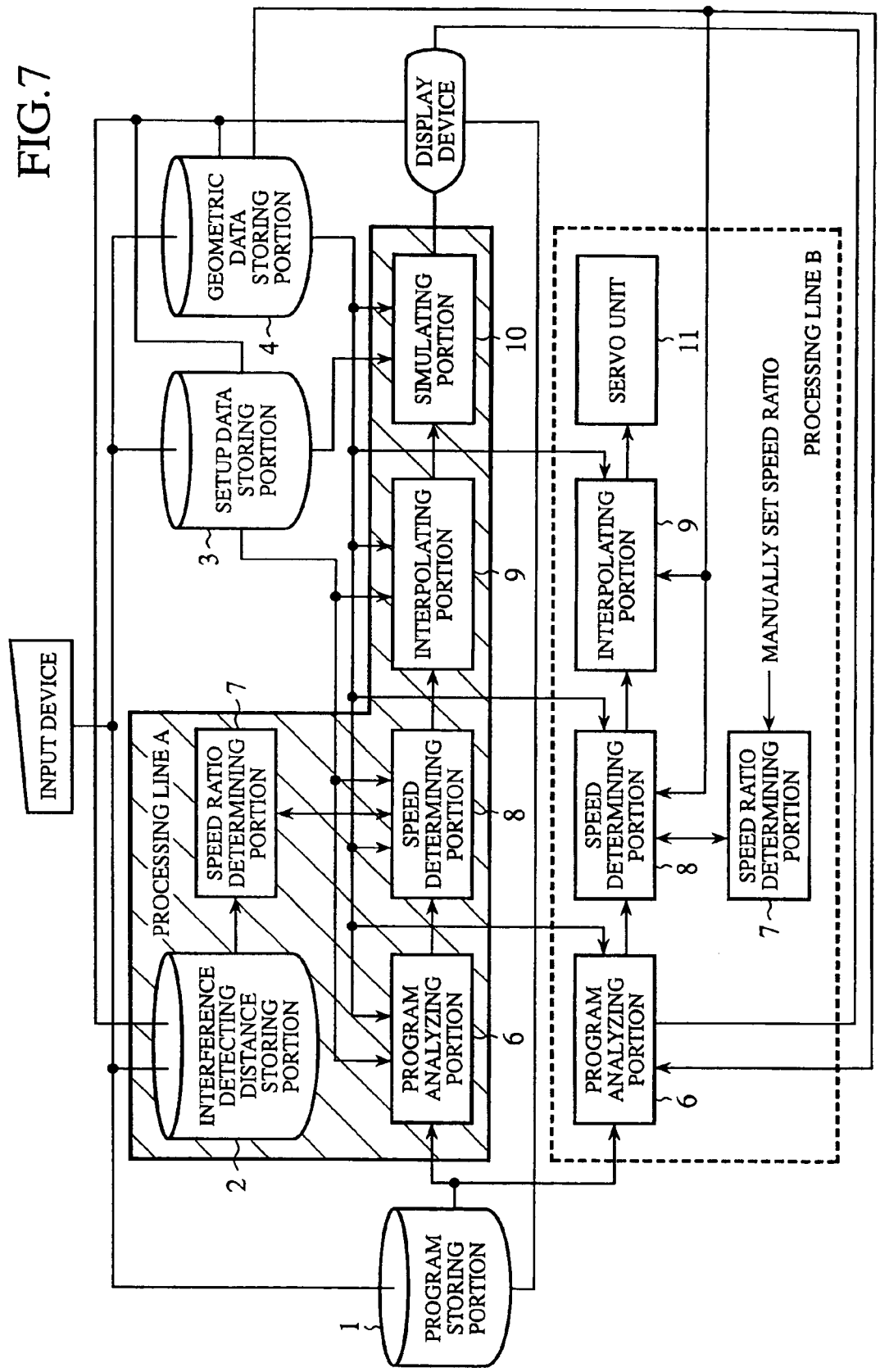
FIG. 7 is a block diagram showing a simulation device according to a third embodiment of the present invention.

While in the first embodiment, the program analyzing portion 6, the speed ratio determining portion 7, the speed determining portion 8, and the interpolating portion 9 are provided by one system, each executing an operation either in a simulation mode or in an actual machine operation mode under the directions of the execution mode changing portion 5, it may be provided a processing line A (encircled area shaded by a slant line) exclusively dedicated to the simulation mode and a processing line B (encircled area indicated by a dotted line) exclusively devoted to an actual machine operation mode, as shown in FIG. 7.

In this way, such separate provision of the processing line A exclusively responsible for the simulation mode and the processing line B exclusively responsible for execution of the actual machine operation mode makes it possible to perform operating a simulation of the machine, even if the actual machine is in operation, using tool information, jig information, information as to where tools are mounted on the tool rest, magazine holding information, ladder program, contact information, or any other information. This executes an operating simulation with accuracy close to the actual machine operation, as well as enhances the work efficiency ranging from a program verification to an actual machine operation.

What is claimed is:

1. A simulation device comprising:

program analyzing means for reading out a feeding speed of an operative part described in a program;

replacing means for calculating maximum feeding speed of the operative part from an interference detecting distance and an interpolation period, and replacing the feeding speed of the operative part, which is read out by the program analyzing means, with the maximum feeding speed;

interpolation point determining means for determining interpolated points of a moving path from the feeding speed of the operative part, which is replaced with the maximum feeding speed by the replacing means, and the interpolation period; and simulation means for making an interference check on the operative part at an interpolated point determined by the interpolation point determining means.

2. The simulation device according to claim 1, wherein the replacing means divides the interference detecting distance by the interpolation period to find a simulation speed, divides the simulation speed by the feeding speed of the operative part, which is read out by the program analyzing means, to find a speed ratio, and multiplies the feeding speed of the operative part by the speed ratio to find the maximum feeding speed of the operative part.

3. The simulation device according to claim 2, wherein the replacing means divides, when there are a plurality of operative parts, the simulation speed by the feeding speed among the feeding speeds of the plurality of operative parts to calculate the speed ratio.

4. The simulation device according to claim 2, wherein the replacing means divides, when there a plurality of machines of interest in the simulation space, the simulation speed by the maximum feeding speed among the feeding speeds of the operative parts of the plurality of machines to find the speed ratio.

5. The simulation device according to claim 1, including driving means for driving the operative part at the feeding speed of the operative part, which is read out by the program analyzing means, when execution mode is changed from a simulation mode to an actual machine operation mode.

6. The simulation device according to claim 5, including program analyzing means, replacing means, and interpolation point determining means for the actual machine operation mode in addition to the program analyzing means, the replacing means, and the interpolation point determining means for the simulation mode.

\* \* \* \* \*